UNITED STATES PATENT OFFICE.

CHARLES L. PARSONS, OF WASHINGTON, DISTRICT OF COLUMBIA.

PROCESS OF OXIDIZING AMMONIA AND CATALYTIC BODIES THEREFOR.

1,239,125.     Specification of Letters Patent.     Patented Sept. 4, 1917.

No Drawing.     Application filed April 20, 1917. Serial No. 163,400.

(DEDICATED TO THE PUBLIC.)

*To all whom it may concern:*

Be it known that I, CHARLES L. PARSONS, a citizen of the United States, and a resident of Washington, in the District of Columbia, and an employee of the United States Bureau of Mines at Washington, have invented certain new and useful Improvements in Processes of Oxidizing Ammonia and Catalytic Bodies Therefor, of which the following is a specification.

This application is made under the act of March 3, 1883, chapter 143 (22 Stat., 625) and the invention herein described and claimed may be used by the Government of the United States or any of its officers or employees in the prosecution of work for the United States, or by any other person in the United States, without the payment of any royalty thereon.

It is well known that when ammonia is mixed with an oxygen-containing gas and the mixture is heated to a suitable temperature, an oxidation and decomposition of the ammonia results with the formation of water and oxids of nitrogen. These reactions attain such a velocity in the presence of certain contact agents that the oxidation of ammonia has become a commercially important method of producing nitric acid. The object of this invention is to provide a contact agent which shows a high degree of effectiveness in promoting the above reaction, and which is in a large measure free from certain defects which are encountered in the use of the substances heretofore proposed.

Another object of my invention is to provide a material with which the catalyzer proper is mixed and on which it is carried in order that the activity of the catalyzer may remain high and unimpaired. These objects I attain by the use of the catalyzers and carriers hereinafter described, and my invention also comprises processes in which mixtures of ammonia and oxygen-containing gases are passed over mixtures of these catalyzers and carriers or over mixtures comprising any of them with other suitable carriers or catalyzers.

I have discovered that lead oxid (PbO) is particularly effective as a contact substance in the oxidation of ammonia. It has heretofore been proposed to employ for this purpose chemical compounds formed by heating lead oxid with magnesium oxid or with some other oxid with which the lead oxid will unite to form a plumbate. Such plumbates form valuable catalyzers but their use is attended with certain disadvantages which I have sought to avoid. In forming the plumbates it is difficult to secure a mass of uniform chemical composition and physical characteristics, great care being required to avoid overheating. Furthermore, the finished plumbate has a strong tendency to become overheated when used and this overheating produces harmful results in the reaction products and in the catalyzer itself.

I have avoided these difficulties by using the lead oxid in uncombined form. In order to produce the necessary porosity of the lead oxid, it has been found advisable to mix the same with a carrier, but for this catalyzer all the hitherto proposed carriers of which I am aware have proved unsuitable. This is because the known carriers, though unaffected by the catalyzers heretofore used, are strongly attacked by the lead oxid at a dull red heat with the formation of plumbates, or glassy inactive masses. Thus, all silicates and all materials containing free silica give lead-silica glasses with the lead oxid.

As a carrier for the lead oxid, I have found that bone ash is admirably fitted. So far as I am aware, this material has not been previously used for this purpose and it will be evident that it may also be advantageously employed with other contact substances having a fluxing action similar to that of lead oxid. The lead oxid may be deposited on the bone ash by well known methods, such as absorbing in the ash a solution of a soluble salt of lead, such as lead nitrate or lead acetate, drying the ash so impregnated and then decomposing the lead salt by heating, or by simply forming a paste of the powdered oxid and bone ash and then drying and igniting the mixture at a low red heat. When properly prepared, the contact material has the homogeneous composition and finely porous texture observable in bone ash cupels which have been used in the cupellation of lead buttons in fire assaying. When crushed to the proper size, the material is highly efficient as a contact body.

I do not limit my invention to lead oxid carried upon bone ash as it will be readily seen that other materials not attacked by lead oxid at temperatures in the neighborhood of 750° C., such as crystalline alumina or carborundum may also be used with advantage. I am aware that Ostwald (British Pat. 698 of 1902) has mentioned that lead peroxid may be used as a catalyzer in the oxidation of ammonia and I do not claim this as part of my invention, except so far as it may be used in combination with bone ash or a similar carrier.

While investigating the action of lead compounds, I have also discovered that lead chromate is a highly effective contact agent. It may be carried upon a suitable inert material and in this case also bone ash is very desirable as a carrier. The chromate may be deposited upon the carrier by treating the latter successively with solutions of lead salts and solutions of compounds of chromic acid, drying, heating, and crushing. The contact material may also be prepared by mixing the powdered carrier and lead chromate as in the case of lead oxid, or in any other suitable way.

I am aware that in the *Berichte der Deutchen Chemische Gesellschaft* 4, 891 (1871) is an abstract of the specification of British patent to du Motay, 491 of 1871, and that said abstract states that the use of lead chromate as a catalyzer in the oxidation of ammonia is proposed in the patent specification. However, British Patent 491 of 1871 makes no mention of lead chromate and so far as I am aware I am the first to propose the use of this compound.

When either lead oxid or lead chromate is employed as the catalytic substance, practically complete oxidation of ammonia to oxids of nitrogen may be obtained. Either the oxid or chromate may in certain cases be used in lump form without a carrier, but in general the use of a carrier with the catalyzer is preferred. When used without a carrier, lead oxid is apt to sinter together unless great care is taken to guard against excessive temperatures, and when such sintering occurs, the individual pieces of the material fuse or weld together with a considerable impairment of the activity of the material. When a suitable inert carrier is employed, this undesirable result is entirely avoided and in addition the effect of a given mass of the oxid is increased by causing it to expose a larger surface to the reacting mixture.

What I claim is:

1. The process of producing oxids of nitrogen which comprises passing a mixture of ammonia and an oxygen-containing gas over a heated composite material comprising a water-insoluble lead compound and a carrier containing a phosphate of an alkali earth metal.

2. The process of producing oxids of nitrogen which comprises passing a mixture of ammonia and an oxygen-containing gas over a catalyzer carried on a material containing a phosphate of an alkali earth metal.

3. The process of producing oxids of nitrogen which comprises passing a mixture of ammonia and an oxygen-containing gas over a heated composite material comprising a lead compound and a carrier containing calcium phosphate.

4. The process of producing oxids of nitrogen which comprises passing a mixture of ammonia and an oxygen-containing gas over a heated composite material comprising a catalyzer and bone ash as a carrier.

5. The process of producing oxids of nitrogen which comprises passing a mixture of ammonia and an oxygen-containing gas over a heated composite material comprising lead chromate and a carrier which is not substantially chemically affected by lead chromate at a temperature of 1000 deg. C.

6. The process of producing oxids of nitrogen which comprises passing a mixture of ammonia and an oxygen-containing gas over lead chromate carried upon bone ash.

7. As a contact material for use in the oxidation of ammonia a composite material comprising lead chromate and a carrier which is not substantially chemically affected by lead chromate at a low red heat.

8. As a contact material, lead chromate carried upon bone ash.

CHARLES L. PARSONS.